United States Patent
Yamada

(10) Patent No.: US 7,864,377 B2
(45) Date of Patent: Jan. 4, 2011

(54) IMAGE-FORMING DEVICE

(75) Inventor: Akihiro Yamada, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 891 days.

(21) Appl. No.: 11/595,920

(22) Filed: Nov. 13, 2006

(65) Prior Publication Data

US 2007/0133039 A1    Jun. 14, 2007

(30) Foreign Application Priority Data

Dec. 12, 2005    (JP)    ............................. 2005-358026

(51) Int. Cl.
*H04N 1/40* (2006.01)
*H04N 1/393* (2006.01)

(52) U.S. Cl. ...................... 358/450; 358/471

(58) Field of Classification Search .................. 358/1.9, 358/1.13, 1.15, 1.16, 404, 444, 400, 401, 358/500, 501, 450, 471; 340/572.4, 572.1; 710/1

See application file for complete search history.

(56) References Cited

U.S. PATENT DOCUMENTS 7,463,388 B2    12/2008    Tomiyasu et al.

| | | | |
|---|---|---|---|
| 2004/0193742 A1* | 9/2004 | Ikeda | 710/1 |
| 2004/0257601 A1 | 12/2004 | Tomiyasu et al. | |
| 2005/0068557 A1* | 3/2005 | Patton et al. | 358/1.13 |
| 2006/0273908 A1* | 12/2006 | Brahmbhatt et al. | 340/572.4 |

FOREIGN PATENT DOCUMENTS

| | | |
|---|---|---|
| JP | 2001-203851 | 7/2001 |
| JP | 2004-262078 | 9/2004 |
| JP | 2005-035144 A | 2/2005 |
| JP | 2005-035145 A | 2/2005 |

OTHER PUBLICATIONS

JP Office Action dtd Jul. 8, 2010, JP Appln. 2005-358026, English translation.

* cited by examiner

*Primary Examiner*—Jerome Grant, II
(74) *Attorney, Agent, or Firm*—Banner & Witcoff, Ltd.

(57) ABSTRACT

An image-forming device includes a casing, an accommodating section, a reading unit, a determining unit, and a printing unit. The casing defines an outer frame. The accommodating section is detachably mounted in the casing and configured to accommodate a stack of sheets, each sheet having a storage section capable of storing data. The reading unit reads data stored in the storage section. The determining unit determines, based on data read by the reading unit and additional data, whether to print an image corresponding to image data, the additional data being added to the image data. The printing unit prints the image on a sheet based on the image data when the determining unit allows printing to be performed.

17 Claims, 13 Drawing Sheets

REAR ← → FRONT

| USE NAME | TOTAL NUMBER OF ACCOMMODATED SHEETS | TIME AND DATE FOR THE LAST PRINTING OPERATION (TIME AND DATE WHEN IC PAPER W WAS LOADED) | | |
|---|---|---|---|---|
| | | MONTH | DAY | TIME |
| USER A | 50 | 11 | 15 | 15:00 |
| USER B | 50 | 12 | 3 | 9:00 |
| USER C | 50 | 12 | 4 | 21:15 |
| ⋮ | ⋮ | ⋮ | ⋮ | ⋮ |

FIG.16

| USE NAME | CASSETTE A | CASSETTE B |
|---|---|---|
| USER A | 50 | 0 |
| USER B | 100 | 100 |
| USER C | 0 | 80 |
| ⋮ | ⋮ | ⋮ |

IMAGE-FORMING DEVICE

CROSS REFERENCE TO RELATED APPLICATIONS

This application claims priority from Japanese Patent Application No. 2005-358026 filed Dec. 12, 2005. The entire content of priority application is incorporated herein by reference.

TECHNICAL FIELD

The present invention relates to an image-forming device.

BACKGROUND

Image-forming devices capable of printing only a specified number of sheets in a printing operation when the user has specified a desired number are well known in the art.

One such image-forming device disclosed in Japanese Patent Application Publication No. 2004-262078 finds the total requested number by adding the requested number of sheets set earlier and the requested number of sheets set this time when the user has specified on a control panel a desired printing time, number of copies, paper cassette, and the like. If this total requested number is greater than the maximum number of sheets of paper that can be accommodated in the paper cassette, the request cannot be made.

This can prevent problems from occurring when a plurality of users request printing jobs. For example, if the total number of requested sheets were greater than the maximum number of sheets that can be accommodated in the paper cassette, a subsequent request from another user would not be printed because of insufficient paper.

SUMMARY

However, the paper cassette does not always accommodate paper of the maximum number of sheets. The image-forming device disclosed in Japanese Patent Application Publication No. 2004-262078 allows a printing request, provided that the total number of sheets in the request is no greater than the maximum number that can be accommodated in the paper cassette, regardless of the actual number of sheets accommodated in the paper cassette. Therefore, there is a risk that the printing job cannot be executed due to insufficient paper, even though the request has been allowed.

In view of the foregoing, it is an object of the present invention to provide an image-forming device capable of allocating sheet for specific users.

To achieve the above and other objects, one aspect of the invention provides an image-forming device including a casing, an accommodating section, a reading unit, a determining unit, and a printing unit. The casing defines an outer frame. The accommodating section is detachably mounted in the casing and configured to accommodate a stack of sheets, each sheet having a storage section capable of storing data. The reading unit reads data stored in the storage section. The determining unit determines, based on data read by the reading unit and additional data, whether to print an image corresponding to image data, the additional data being added to the image data. The printing unit prints the image on a sheet based on the image data when the determining unit allows printing to be performed.

BRIEF DESCRIPTION OF THE DRAWINGS

In the drawings:

FIG. 16 is an explanatory diagram conceptualizing data stored in RAM of a multifunction device according to the second aspect of the invention.

DETAILED DESCRIPTION

<First Aspect>

A first aspect of the present invention will be described while referring to the accompanying drawings.

1. Entire Structure

Figure 1:
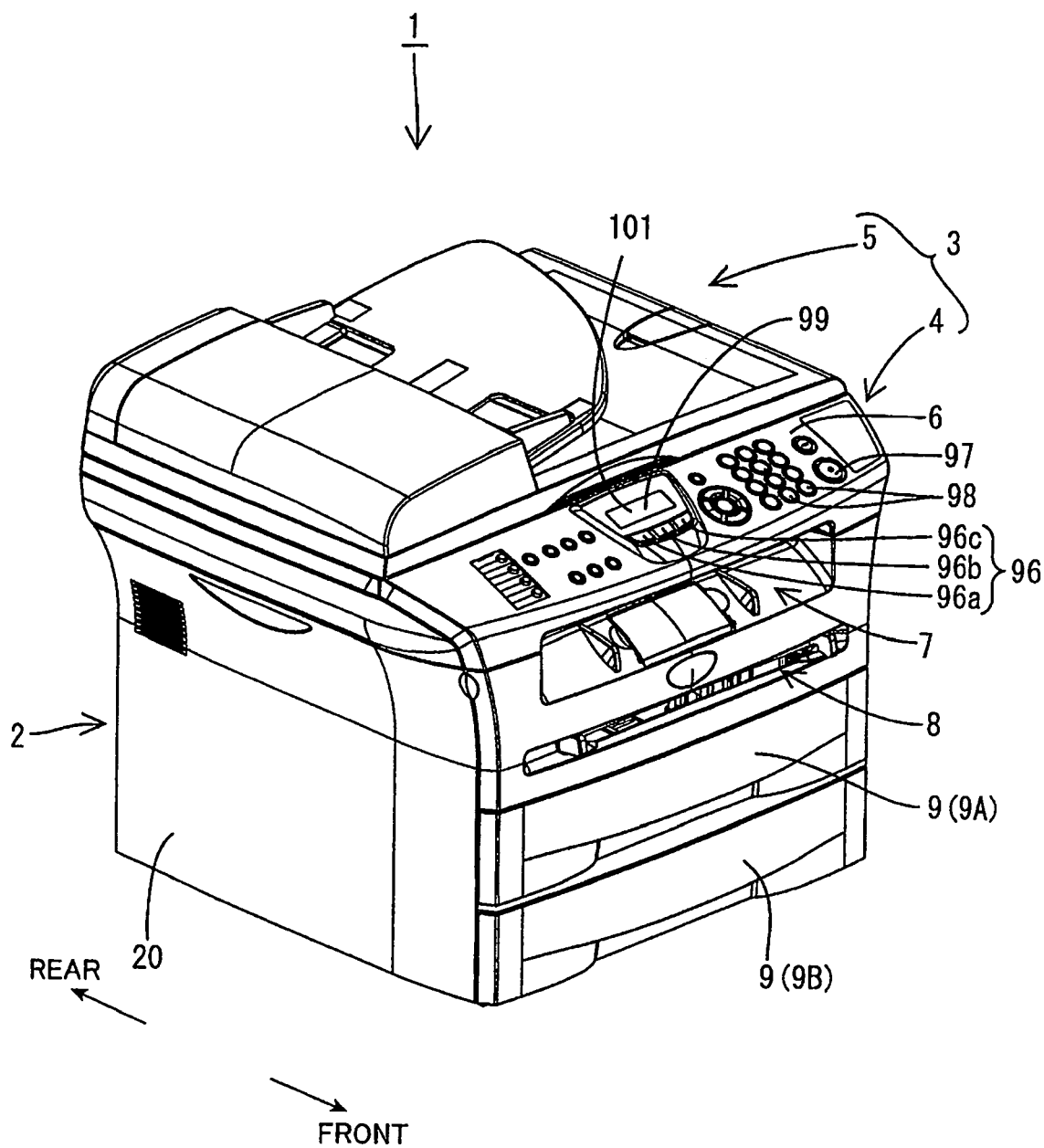
FIG. 1 is a perspective view showing the external appearance of a multifunction device according to a first aspect of the invention.
Figure 2:
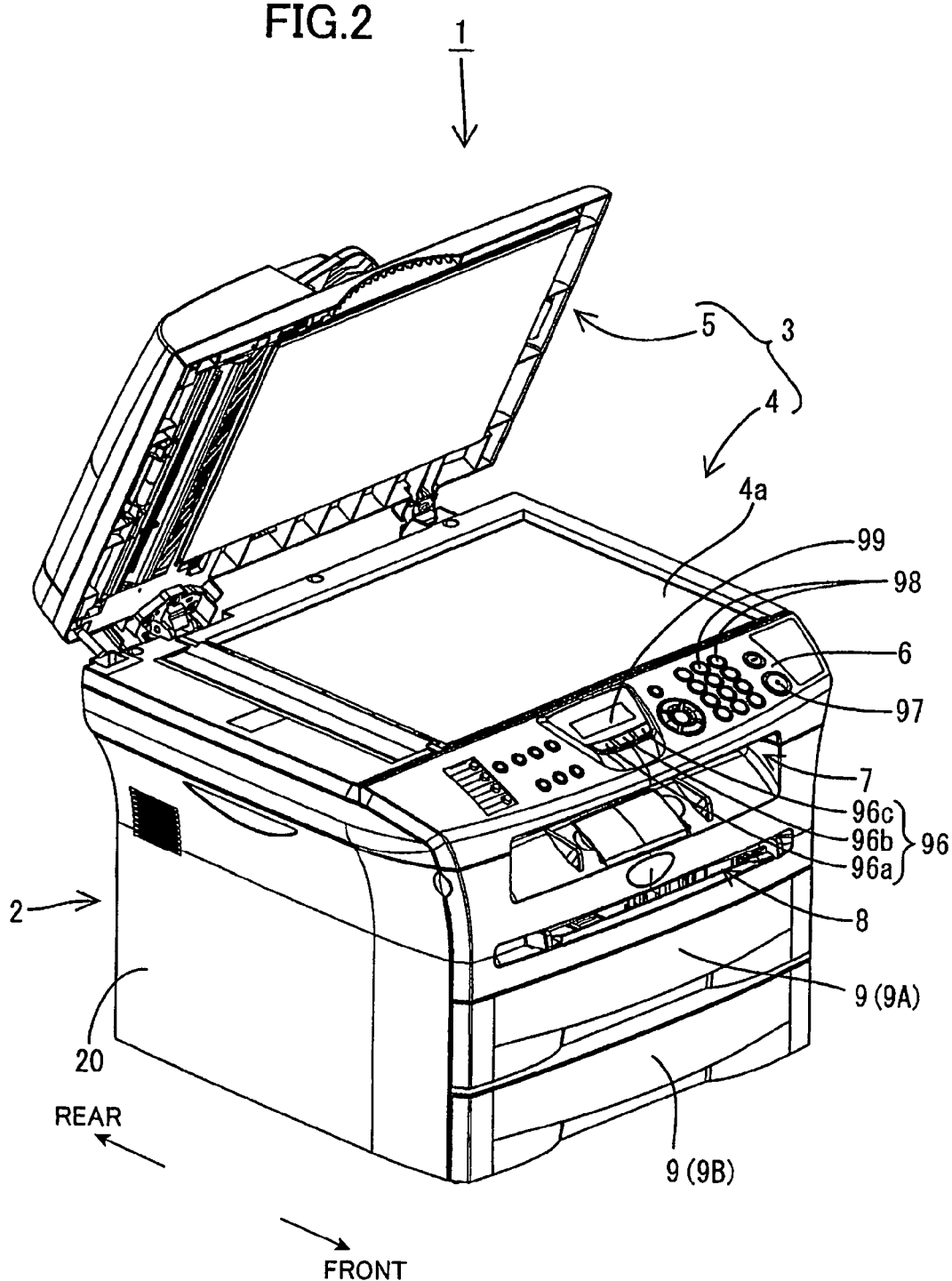
FIG. 2 is a perspective view of the multifunction device in FIG. 1 when a scanning unit is open.

A multifunction device 1 according to some aspects of the invention has a printer function, scanner function, copier function, and the like. FIG. 1 is a perspective view showing the external appearance of the multifunction device 1. FIG. 2 is a perspective view of the multifunction device 1 when a scanning unit 3 is open. In the following description, a side of the multifunction device 1 on which a control panel 6 is provided (the lower right side in FIG. 1) will be referred to as the "front," while the opposite side (upper left in FIG. 1) will be referred to as the "rear."

Figure 3:
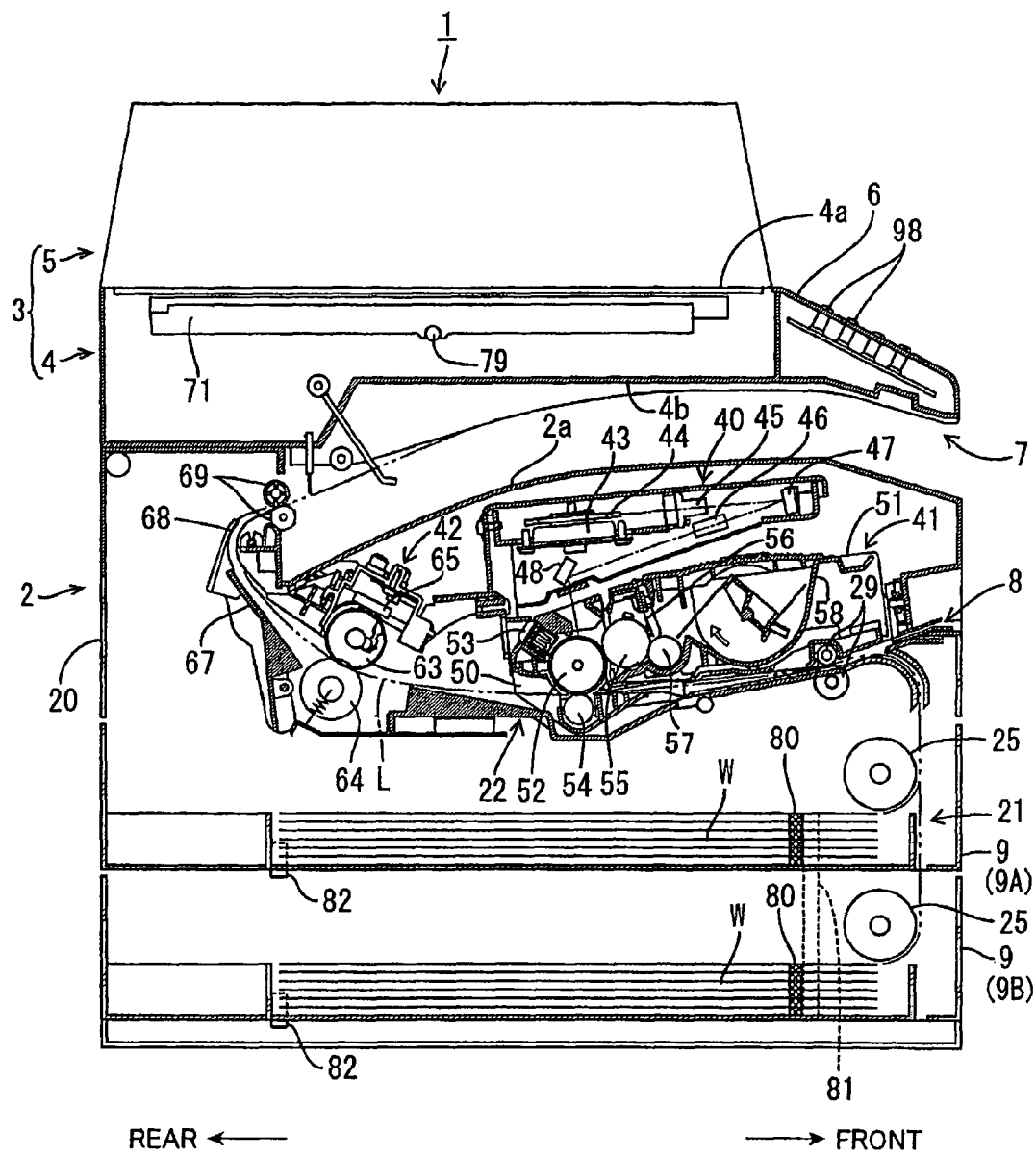
FIG. 3 is a side cross-sectional view of the multifunction device according to the first aspect of the invention.

As shown in FIG. 3, the multifunction device 1 includes an image-forming unit 2 accommodating a feeding section 21, an image-forming section 22, and the like; and a scanning unit 3 with an automatic document feeding function. As shown in FIGS. 1 and 2, the scanning unit 3 includes an image-reading device 4 having a rectangular-shaped original support 4a on the top surface thereof, and an automatic document feeder (hereinafter referred to as "ADF 5") arranged so as to cover the original support 4a. As shown in FIG. 2, a rear edge of the scanning unit 3 on the side opposite the control panel 6 is rotatably supported on a top rear edge of the image-forming unit 2 so that the scanning unit 3 is capable of rotating on the image-forming unit 2.

A control panel 6 through which the user can input various operations is provided on one edge of the image-reading device 4 (on the bottom right in FIG. 1).

The control panel 6 includes a mode switch 96, a Start key 97, various operating buttons 98, and a touch panel 99 which is a liquid crystal display (LCD).

The mode switch 96 enables the user to select from among the modes printer function, facsimile function, and scanner function. More specifically, the mode switch 96 includes three mode keys juxtaposed left to right. The three mode keys are a copy mode key 96a for selecting a copy mode, a fax mode key 96b for selecting a fax mode, and a scanner mode key 96c for selecting a scanner mode.

The Start key 97 enables the user to initiate an operation corresponding to the mode. For example, if the Start key 97 is pressed (turned on) in the copy mode, the multifunction device 1 begins an operation to copy an original document placed on the document support 4a. If the Start key 97 is pressed in the fax mode or scanner mode, the multifunction device 1 performs an operation to read an original intended for a facsimile transmission or to read an original to be scanned.

The user can display menu buttons (not shown) on the touch panel 99 by performing a prescribed operation. The user touches a desired menu button to display the corresponding settings. For example, when performing a printing operation, the user can input user data (a user ID, for example) using the touch panel 99.

As will be described later, if the inputted user data matches user ID data for IC paper W currently loaded in the paper cassette 9 (9A, 9B), then printing is performed on only the number of sheets of the IC paper W having this user ID data. When a printing request is transmitted from an external personal computer via a network interface 95, image data and user data is also transmitted from the personal computer (see FIG. 4).

If an error occurs after receiving a printing request due to insufficient IC paper W or the like, an error message is displayed on a display unit 101 (see FIG. 1) constituting part of the touch panel 99, notifying the user of the error.

A paper retrieval opening 7 is formed below the control panel 6. The user can access a discharge tray 2a described later via the paper retrieval opening 7. A manual feed opening 8 is formed in the image-forming unit 2 below the paper retrieval opening 7 as a slit-shaped opening extending horizontally. Two paper cassettes 9A and 9B are provided below the manual feed opening 8.

(Image-Forming Unit)

Next, the structure of the image-forming unit 2 will be described with reference to FIG. 3. FIG. 3 is a side cross-sectional view of the multifunction device 1 from a perspective along an axis of a feeding roller 25 and the like. In FIG. 3, the right side of the multifunction device 1 is the front side, and the left side is the rear side.

The image-forming unit 2 has a casing 20 for accommodating the feeding section 21 that feeds sheets of the IC paper W, the image-forming section 22 for forming prescribed images on the IC paper W fed by the feeding section 21, and the like. The discharge tray 2a is provided above the image-forming section 22 for maintaining sheets of the IC paper W that have been discharged after the image-forming section 22 has formed images thereon.

The feeding section 21 includes the paper cassettes 9A and 9B, a pivotable paper-pressing plate (not shown) disposed in each paper cassette 9 and a feeding roller 25 disposed above the front edge of each paper cassette 9.

(Paper Cassettes)

The paper cassettes 9A and 9B are detachably mounted in a lower section of the casing 20 and are capable of being mounted through or removed from the control panel 6 side of the multifunction device 1. The paper cassettes 9A and 9B function to accommodate paper in a stacked state. The feeding rollers 25 convey the topmost sheets of paper in the paper cassettes 9A and 9B to the registration rollers 29 along a paper-conveying path.

In the first aspect, the paper cassettes 9A and 9B accommodate an IC paper W having a RFID tag 80. The RFID tag 80 is capable of storing data and transmitting and receiving radio waves through an antenna (not shown).

Figure 5:
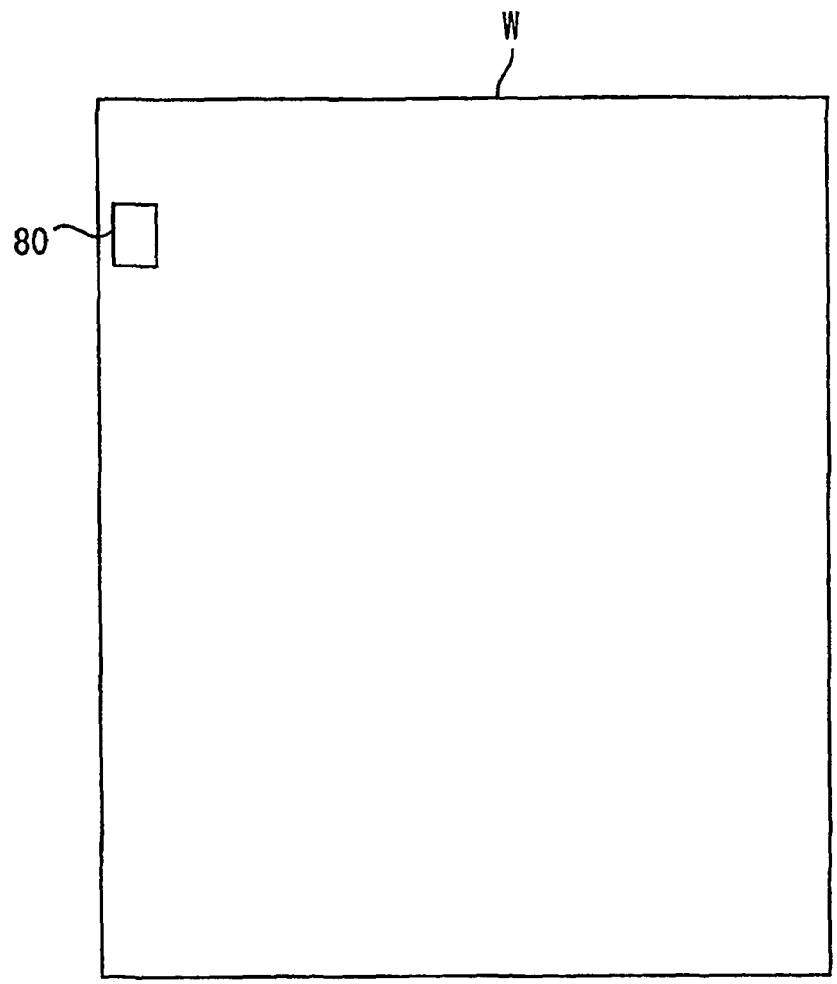
FIG. 5 is an explanatory diagram illustrating the structure of IC paper used in the multifunction device according to the first aspect of the invention.

As shown in FIG. 5, the IC paper W includes the RFID tag 80 embedded in an edge part of the rectangular IC paper W (a margin area near the left edge in the drawing, but a corner of the IC paper W is also fine). The IC paper W may be printed on the surface, similar to normal paper.

The data stored in the RFID tag 80 may include paper ID data for distinguishing a plurality of IC paper W, and user ID data for identifying a user who is authorized to use the IC paper W. If anyone is allowed to use the IC paper W for printing, the RFID tag 80 need not store user ID data or may include such data as "ANY" that does not specify a user. Further, normal paper that does not include the RFID tag 80 can be printed by anyone since the paper does not have user ID data.

In addition, an IC reader/writer 81 is disposed vertically along the side of the two paper cassettes 9A and 9B at a height spanning the entire paper cassettes 9A and 9B.

(IC Reader/Writer)

The IC reader/writer 81 generates radio waves from an antenna (not shown) for reading data stored in the RFID tag 80 of the IC paper W or rewriting the data stored in the RFID tag 80 of the IC paper W.

When a plurality of the RFID tags 80 are present within a communicating range of the IC reader/writer 81, all of the RFID tags 80 attempt to respond at once to a query from the IC reader/writer 81. This can cause a collision that prevents the IC reader/writer 81 from reading data in the RFID tag 80.

Therefore, in the first aspect, the timing of responses to a query from the IC reader/writer 81 is varied among the RFID tags 80 (the IC paper W). More specifically, the timing is varied according to the value of a special bit in the ID of the RFID tag 80.

In this way, the IC reader/writer 81 can communicate one-on-one with the RFID tag. 80 being read. After completing communications, the IC reader/writer 81 puts the RFID tag 80 to sleep so that this RFID tag 80 cannot respond to the IC reader/writer 81 even when the RFID tag 80 is within the communicating range of the IC reader/writer 81. By performing this operation with each RFID tag 80, the IC reader/writer 81 can read and rewrite data stored in all of the IC paper W (RFID tags 80) accommodated in the paper cassettes 9A and 9B.

A mounting sensor 82 is disposed on the side and near the rear edge of each paper cassette 9 when the paper cassettes 9A and 9B are mounted in the image-forming unit 2 for detecting mounting and removal of the paper cassettes.

Each mounting sensor 82 is a photoelectric sensor having a light-emitting element (not shown) and a light-receiving element (not shown) for receiving light emitted from the light-emitting element. The light-emitting element and light-receiving element are disposed in confrontation with each other, one on either side of the paper cassette 9. When the paper cassette 9 is mounted in the casing 20, the side walls of the paper cassette 9 block the light emitted from the light-emitting element. When the paper cassette 9 is removed from the casing 20, the light-receiving element receives light from the light-emitting element.

The light-emitting element in each mounting sensor 82 outputs a signal to a CPU 90 corresponding to changes in the amount of received light. In this way, the CPU 90 can detect when the paper cassettes 9A and 9B are mounted and removed.

A pair of registration rollers 29 functions to correct misalignment in the IC paper W conveyed along the paper-conveying path. This is accomplished with a position sensor (not shown) disposed near the feeding roller 25, and a control system (not shown) for controlling when the 29 are driven and halted based on a detection timing of the position sensor.

The image-forming section 22 includes a scanning unit 40, a process unit 41, and a fixing unit 42.

As shown in FIG. 3, the scanning unit 40 is disposed in an upper section of the casing 20 and includes a laser light-emitting unit (not shown), a polygon mirror 44 that is rotatably disposed, a polygon motor 43 for driving the polygon mirror 44 to rotate, lenses 45 and 46, and reflecting mirrors 47 and 48. The laser light-emitting unit emits a laser beam based on prescribed image data. The laser beam passes through or is reflected by the polygon mirror 44, lens 45, reflecting mirror 47, lens 46, and reflecting mirror 48 in the order given. The laser beam is irradiated in a high-speed scan over the surface of a photosensitive drum 52 in the process unit 41 described later.

The process unit 41 provided in the multifunction device 1 is detachably mounted in a body of the image-forming unit 2. The process unit 41 includes a drum cartridge 50, and a developer cartridge 51.

The drum cartridge 50 of the process unit 41 includes the photosensitive drum 52, a Scorotron charger 53, and a transfer roller 54. The developer cartridge 51 includes a developing roller 55, a thickness-regulating blade 56 for contacting the developing roller 55 with pressure, a toner-supplying roller 57, and a toner box 58 filled with toner.

The photosensitive drum 52 is disposed on a side of the developing roller 55 and is capable of rotating clockwise in FIG. 3 while in confrontation with the developing roller 55.

The charger 53 is disposed in opposition to the photosensitive drum 52, but separated a prescribed distance therefrom so as not to contact the photosensitive drum 52. The charger 53 is a positive charging Scorotron type charger.

As the photosensitive drum 52 rotates, the charger 53 charges the surface of the photosensitive drum 52 with a uniform positive polarity. Subsequently, the scanning unit 40 irradiates a laser beam in a high-speed scan to form an electrostatic latent image on the surface of the photosensitive drum 52 based on prescribed image data.

Next, positively charged toner carried on the surface of the developing roller 55 comes into contact with the photosensitive drum 52 as the developing roller 55 rotates and is supplied to the latent images formed on the surface of the photosensitive drum 52.

The transfer roller 54 is rotatably supported below the photosensitive drum 52 and in confrontation with the same. The transfer roller 54 is capable of rotating counterclockwise in FIG. 3. The visible image carried on the surface of the photosensitive drum 52 is transferred onto the IC paper W as the IC paper W passes between the photosensitive drum 52 and the transfer roller 54.

The fixing unit 42 is disposed downstream of the process unit 41 in the paper-conveying direction (rearward). The fixing unit 42 includes a heating roller 63 for generating heat to fuse the toner on the paper surface, a pressure roller 64 for pressing the paper against the heating roller 63, and a thermostat 65.

The heating roller 63 has a cylindrical member configured of a metal tube, and a halogen lamp accommodated in the metal tube and extending in the axial direction of the tube. The halogen lamp can heat a surface of the heating roller 63 to a fixing temperature (for example, 200°C.) which the toner is fixed on the IC paper W.

The pressure roller 64 is configured of a metal roller shaft covered with a rubber roller that is formed of a rubber material. The pressure, roller 64 follows the rotation of the heating roller 63 while elastically pressing against the metal tube of the heating roller 63 with the rubber roller.

The thermostat 65 is a bi-metal thermostat, for example, that functions to turn the power of the heater for heating the heating roller 63 on and off in response to heat generated from the heating roller 63. In this way, the thermostat 65 prevents the heating roller 63 from being heated to an abnormally high temperature.

In the fixing unit 42 having this construction, toner transferred onto a sheet of the IC paper W in the process unit 41 is fixed by heat generated in the heating roller 63 and pressure provided by the pressure roller 64 as the IC paper W passes between the heating roller 63 and the pressure roller 64.

After the fixing process, the IC paper W is conveyed along a discharge path leading to the discharge tray 2a. The discharge path is formed by guide members 67 and 68. A pair of discharge rollers 69 is disposed at the top of the discharge path for discharging the paper W received from the fixing unit 42 onto the discharge tray 2a.

(Scanning Unit)

As described above, the scanning unit 3 includes the image-reading device 4 and ADF 5, and the image-reading device 4 is disposed above the discharge tray 2a of the image-forming unit 2. The image-reading device 4 has a bottom surface 4b that faces and acts as a covering for the discharge tray 2a.

The scanning unit 3 is configured as a flatbed scanner. With this flatbed structure, opening the ADF 5 rearward exposes the document support 4a (see FIG. 2) so that a book or other original document can be placed on the document support 4a to be scanned during a copying operation or the like.

The scanning unit 3 can scan an original M when the original M is placed on the document support 4a or when the original M is conveyed by the ADF 5. When the original M is placed on the document support 4a, a contact image sensor (CIS) 71 moves along the document support 4a via a shaft 79 extending in the conveying direction of the original M in order to scan the original M supported on the document support 4a one line at a time. When using the ADF 5, the CIS 71 is moved to the left edge of the document support 4a. Maintained in this position, the CIS 71 scans the original M one line at a time while the original M is conveyed by the ADF 5.

(Electrical Structure)

Next, a simplified electrical structure of the multifunction device 1 will be described with reference to FIG. 4.

Figure 4:
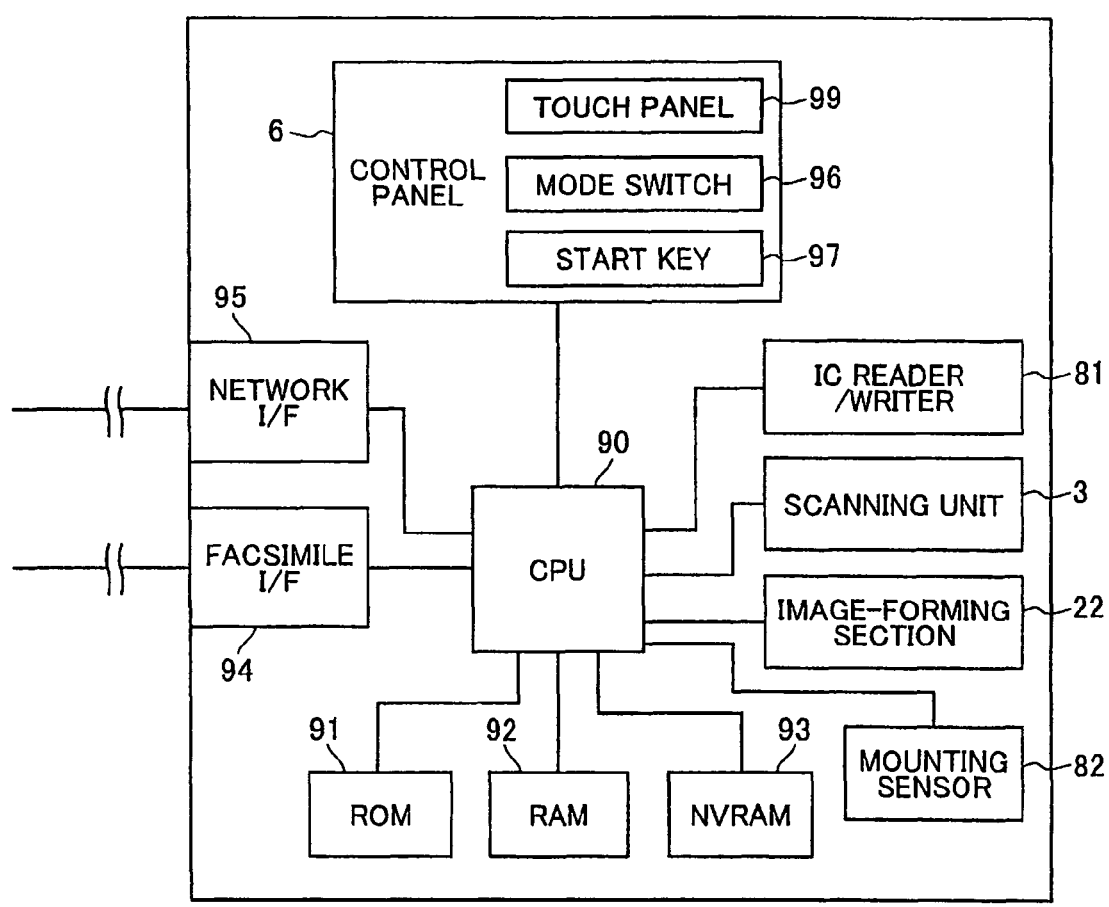
FIG. 4 is a block diagram showing the electrical structure of the multifunction device according to the first aspect of the invention.

As shown in FIG. 4, the multifunction device 1 includes the control panel 6 that accepts various inputted operations from the user; the mounting sensor 82 for detecting when the paper cassettes 9 (9A, 9B) are removed and mounted; the IC reader/writer 81 for reading and rewriting the data stored in the RFID tag 80; the scanning unit 3 for reading image data; the image-forming section 22 for printing and fixing by heat generated in the fixing unit 42; a ROM 91; a RAM 92; a NVRAM 93 (a nonvolatile memory); the CPU 90; a facsimile interface 94 for connecting to a telephone line or other communications line; and a network interface 95 for connecting to an external device such as a personal computer (not shown).

The NVRAM 93 stores a time value indicating when data in the RFID tag 80 of IC paper W belonging to a user who has not printed in a long period of time can be rewritten to the value "ANY," indicating that the IC paper W may be used by anyone. This prevents the problem of another user not being able to print because the paper cassettes 9A and 9B accommodate IC paper W of a user who has not printed in a long time. The user can set and modify this time value via the touch panel 99 or the like.

When the CPU 90 receives image data from an external personal computer or receives image data from the scanning unit 3 during a copy operation, the CPU 90 stores the image data and data attached to this image data (for example, user data for the user who issued the print command, and page data indicating the number of pages in the printing operation) in the RAM 92.

After printing an image, the CPU 90 stores the time and date for the current printing operation in the NVRAM 93.

2. Structure Enabling the user to Allocate IC Paper W for Printing

Figure 6:
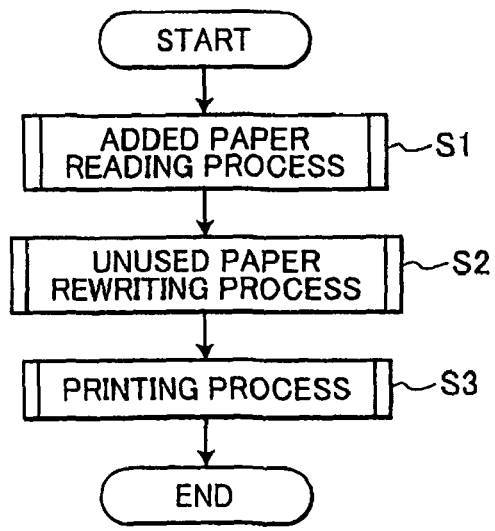
FIG. 6 is a flowchart illustrating steps in a process executed by a CPU of the multifunction device according to the first aspect of the invention.

As shown in FIG. 6, the CPU 90 repeatedly performs the following steps in order. In S1 the CPU 90 performs an added paper reading process for reading data in the RFID tags 80 when IC paper W is added (when the paper cassette 9 is remounted). In S2 the CPU 90 performs an unused paper rewriting process for rewriting data in the RFID tags 80 of IC paper W that has not undergone printing for the prescribed time, enabling anyone to use the IC paper W. In S3 the CPU 90 performs a printing process based on the data in the RFID tags 80.

Next, these processes will be described in greater detail.

(Added Paper Reading Process)

Figure 7:
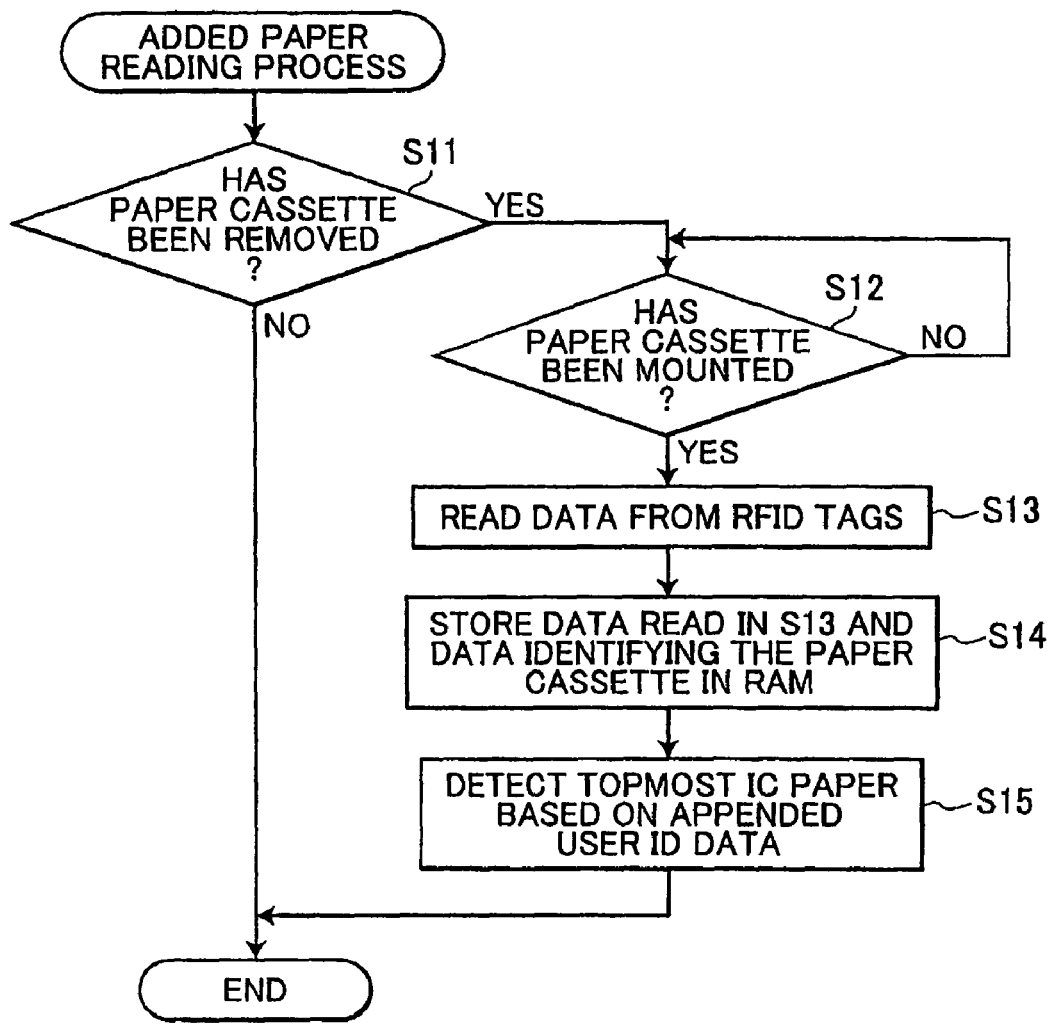
FIG. 7 is a flowchart illustrating steps in an added paper reading process performed by the multifunction device according to the first aspect of the invention.

In S11 of the added paper reading process shown in FIG. 7, the CPU 90 detects whether the paper cassette 9 has been removed based on a signal received from the mounting sensor 82. If the paper cassette 9 has not been removed (S11: no), then the added paper reading process ends.

However, if the CPU 90 detects that the paper cassette 9 has been removed based on the signal received from the mounting sensor 82 (S11: yes), then in S12 the CPU 90 waits (S12: no) until the CPU 90 has received a signal from the mounting sensor 82 indicating that the paper cassette 9 has been closed.

When the CPU 90 detects that the paper cassette 9 has been closed based on the signal from the mounting sensor 82 (S12: yes), then in S13 the CPU 90 activates the IC reader/writer 81 to read data stored in the RFID tag 80 for all IC paper W accommodated in the paper cassette 9. This data is paper ID data for distinguishing the plurality of sheets of IC paper W, and user ID data for identifying the user who can use the IC paper W. In S14 the CPU 90 stores in the RAM 92 the paper ID data and user ID data read in S13, and data received from the mounting sensor 82 indicating whether the paper cassette 9 is the paper cassette 9A or the paper cassette 9B.

Here, the CPU 90 compares the user ID data of the RFID tag 80 read when the paper cassette 9 was previously mounted to the user ID data for the RFID tag 80 read when the paper cassette 9 was last mounted. Since the user ID data for the currently added IC paper W includes the user ID data stored in the RFID tag 80 of the topmost IC paper W stacked in the paper cassette that was just remounted, in S15 the CPU 90 stores this user ID data in the RAM 92 as the user ID data for the topmost sheet of the IC paper W.

Figure 8:
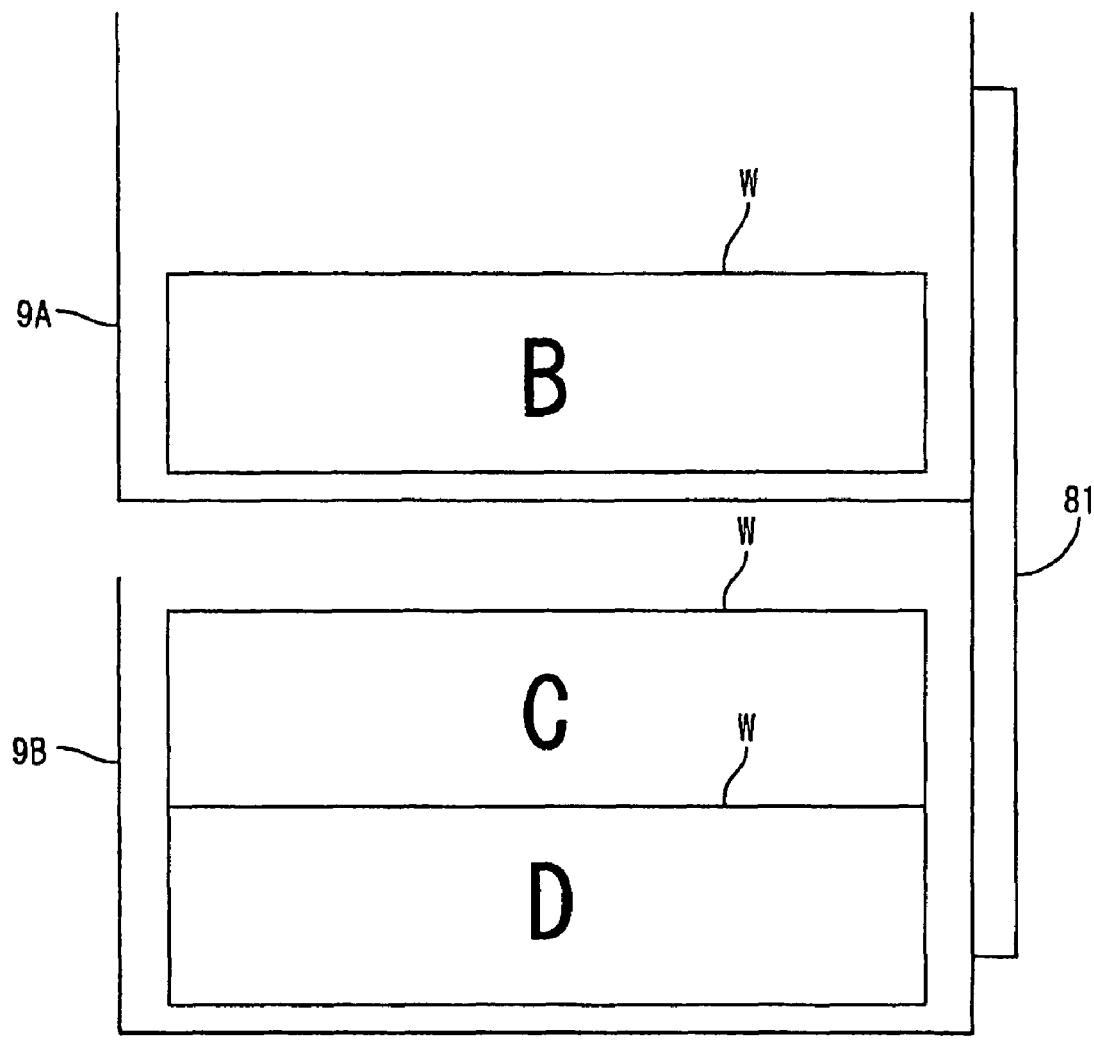
FIG. 8 is an explanatory diagram conceptualizing the state of IC paper accommodated in paper cassettes of the multifunction device according to the first aspect of the invention.
Figure 9:
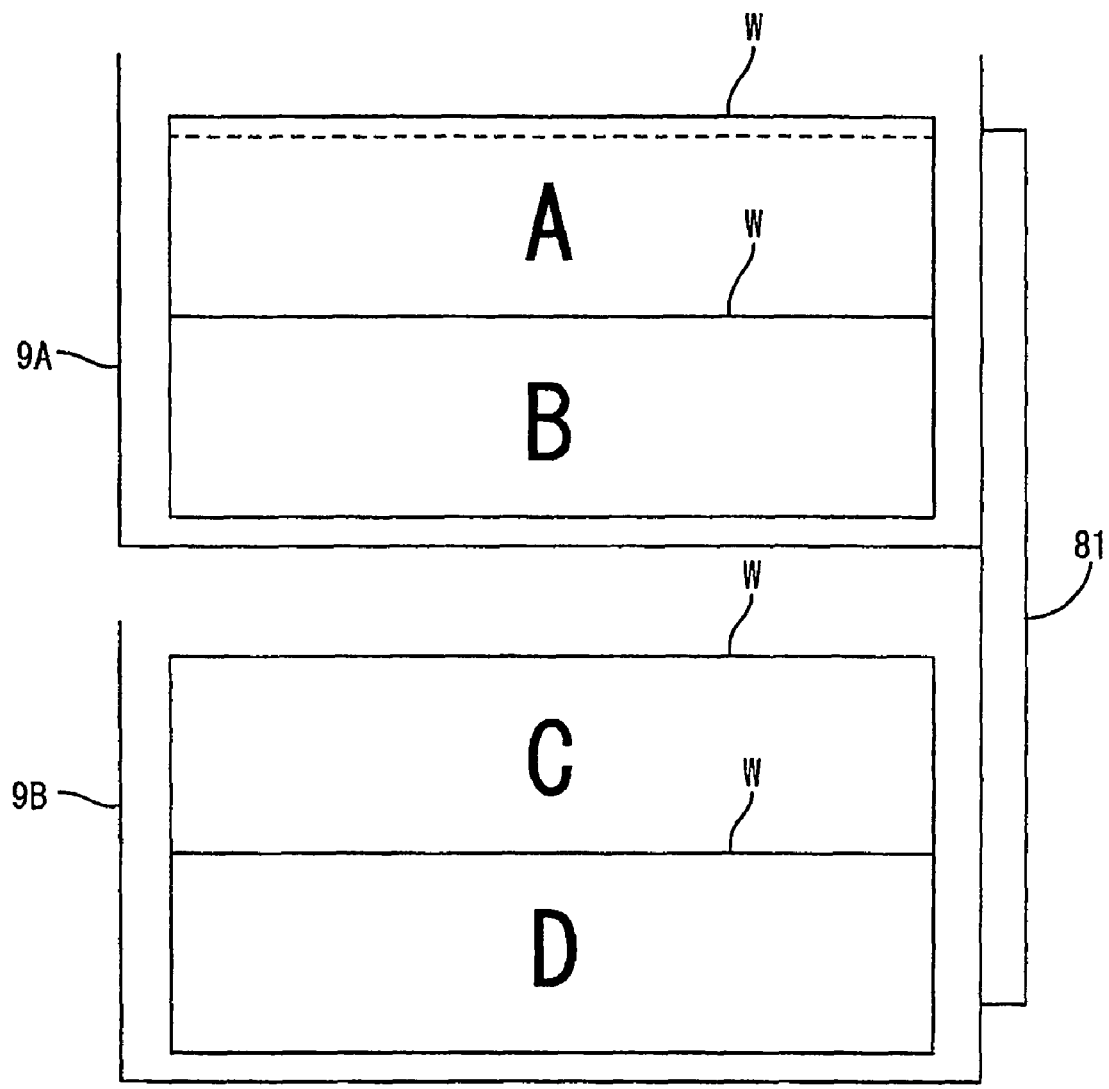
FIG. 9 is an explanatory diagram conceptualizing the state of IC paper added to the paper cassettes of the multifunction device according to the first aspect of the invention.

For example, as shown in FIG. 8, IC paper W for a User B (the User B is stored in the RFID tag 80 as the user ID data) is accommodated in the paper cassette 9A, while IC paper W for a User C and IC paper W for a User D is stored in the paper cassette 9B. When IC paper W for a User A is accommodated in the paper cassette 9A when the paper cassette 9A is remounted at this time, as shown in FIG. 9, data for User A is added to the data read at this time. Therefore, it is possible to determine based on the added user ID data and data for the paper cassette 9A mounted at this time that the topmost IC paper W accommodated in the paper cassette 9A is IC paper W allocated for User A.

(Unused Paper Rewriting Process)

Figures 10, 11:
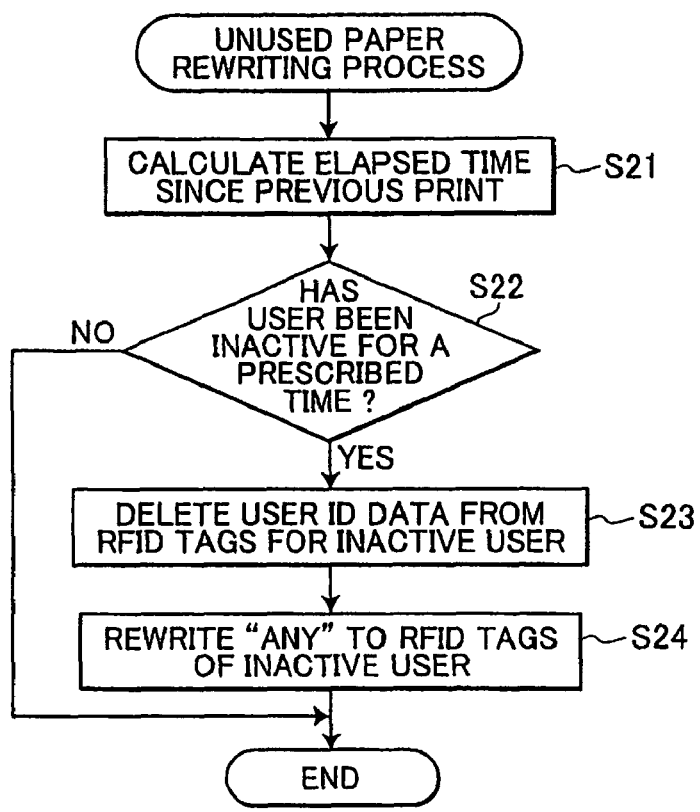
FIG. 10 is a flowchart illustrating steps in an unused paper writing process performed by the multifunction device according to the first aspect of the invention.
FIG. 11 is an explanatory diagram conceptualizing data stored in RAM of the multifunction device according to the first aspect of the invention.

Next, the unused paper rewriting process will be described with reference to FIG. 10. In S21 the CPU 90 reads the time and date stored for each user in the NVRAM 93 for the last printing operation (or the time and date when the IC paper W was loaded if the user has not printed even once) and stores this data in the RAM 92 (see FIG. 11). At the same time, the CPU 90 calculates the time that has elapsed since each user last performed a printing operation, that is, the elapsed time since the time read in S21.

In S22 the CPU 90 determines whether the calculated time is greater than or equal to a prescribed time stored in the NVRAM 93.

If a user is found to have not performed a printing operation for the prescribed time or greater (S22: yes), then in S23 the CPU 90 activates the IC reader/writer 81 to delete the user ID data for the IC paper W of this inactive user (the IC paper W with a RFID tag 80 storing the user ID data of the inactive user). In S24, the CPU 90 writes the data "ANY" in the area of the deleted RFID tag 80 indicating that the paper may be used by any user. For example, the CPU 90 may rewrite the user ID data "User A" with "ANY" when User A has not performed a printing operation for the prescribed time or greater. Subsequently, the CPU 90 ends the unused paper rewriting process.

However, if there exists no user who has been inactive for the prescribed time or greater (S22: no), then the CPU 90 ends the unused paper rewriting process with no action.

(Printing Process)

Next, the printing process will be described with reference to FIG. 13. When the CPU 90 receives a printing request from an external personal computer connected via the network interface 95 (or through the control panel 6; S31: yes), in S32 the CPU 90 saves the user data attached to the image data for the print job in the RAM 92 and generates image data by developing PDL data into bitmap data. If the CPU 90 does not receive a printing request from the external personal computer (or through the control panel 6; S31: no), then the CPU 90 repeats the process in S31 until a printing request is received from an external personal computer (or the control panel 6; S31: yes).

In S34 the CPU 90 reads user ID data and paper ID data for distinguishing the plurality of IC paper W from the RFID tags 80 of all IC paper W, and saves this data in the RAM 92.

In S35 the CPU 90 confirms the user ID data stored in the topmost sheet of IC paper W accommodated in the paper cassette 9 for each of the paper cassettes 9A and 9B based on a history of mounting and removal for the paper cassettes 9A and 9B stored in the NVRAM 93, user ID data for the loaded IC paper W, and data for the number of sheets of IC paper W that have been printed after the IC paper W was loaded.

In S36 the CPU 90 determines whether the user ID data stored in the topmost IC paper W within either of the paper cassettes 9A and 9B matches the user data attached to the image data to be printed. The CPU 90 may also determine whether the data stored in the topmost IC paper W is "ANY" or whether the IC paper W has no RFID tag 80.

If the user ID data stored in the topmost IC paper W matches the user data for the printing operation (or if the data stored in the topmost IC paper W is "ANY" or if the paper has no RFID tag 80; S36: yes), then in S37 the CPU 90 feeds the IC paper W from the corresponding paper cassette 9 (i.e., the paper cassette 9 accommodating IC paper W with the matching user ID data) and prints the image data on the IC paper W. In S38 the CPU 90 stores the date and time of the printing operation in the NVRAM 93 and performs the following paper setting writing process.

However, if the CPU 90 determines that the user ID data stored in the topmost IC paper W does not match the user data for the printing operation (and if the data stored in the topmost IC paper W is not "ANY" but includes the RFID tag 80; S36: no), then in S39 the CPU 90 determines whether any of the sheets of IC paper W has a RFID tag 80 storing the user ID data corresponding to the user data for the printing operation (or whether any of the IC paper W has a RFID tag 80 storing "ANY" or does not have a RFID tag 80).

If the CPU 90 determines that there exists IC paper W with a RFID tag 80 storing the user ID data corresponding to the user data for the printing operation (or that there exists IC paper W having a RFID tag 80 storing "ANY" or having no RFID tag 80; S39: yes), then in S40 the CPU 90 sets the topmost IC paper W in the paper cassette 9 storing the relevant IC paper W as substitute paper that can be used for printing, regardless of the data stored in the RFID tag 80 of this IC paper W.

Accordingly, the CPU 90 prints an image on the IC paper W set as substitute paper based on the image data by feeding the IC paper W set as substitute paper. In S38 the CPU 90 stores the date and time of the printing operation in the NVRAM 93 and performs the following paper setting writing process.

(Paper Setting Writing Process)

Next, the paper setting writing process will be described with reference to FIG. 13. In S51 of the paper setting writing process, the CPU 90 determines whether the user has set a paper substitute. If the user has not set a paper substitute (S51: no), then the CPU 90 ends the paper setting writing process, and subsequently ends the printing process.

However, if the user has set a paper substitute (S51: yes), then in S52 the CPU 90 writes the user ID data stored in the RFID tag 80 of the printed IC paper W (the topmost sheet of IC paper W) to the RFID tag 80 of the IC paper W storing user ID data that corresponds to the data appended to the printed image data (the RFID tag 80 for any one of the IC papers W belonging to the user that is accommodated in the paper cassette 9). In S53 the CPU 90 clears the paper substitution setting, ends the paper setting writing process, and ends the printing process.

Figure 13:
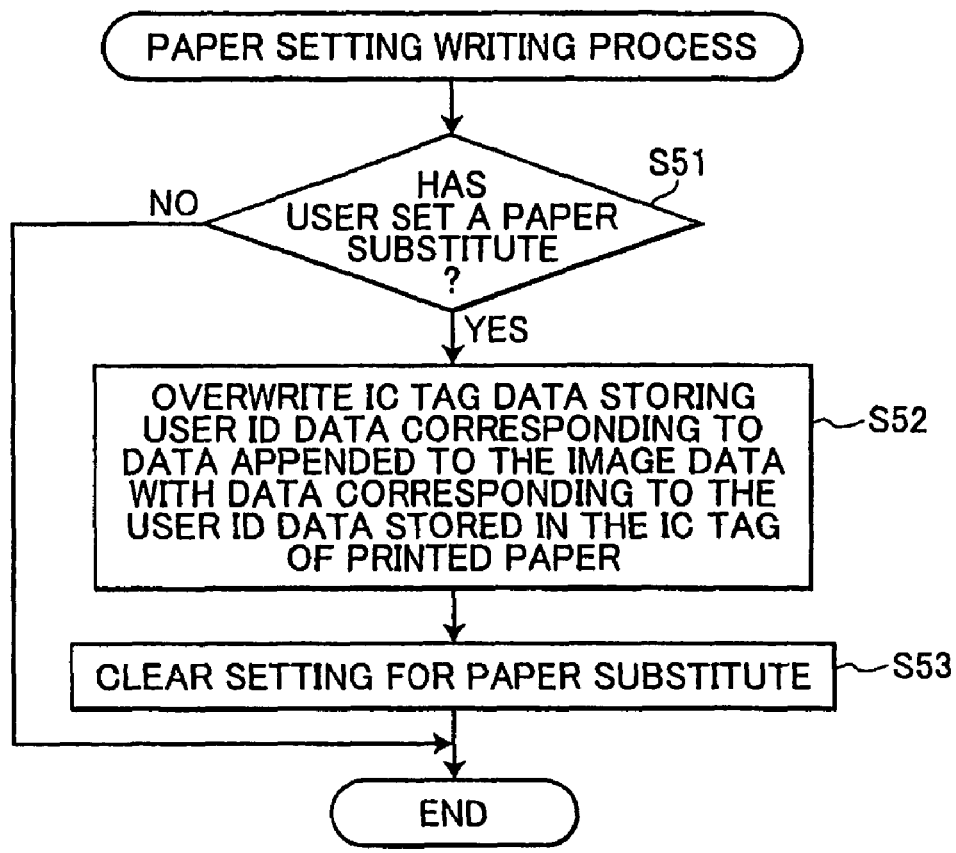
FIG. 13 is a flowchart illustrating steps in a paper setting writing process executed by the multifunction device according to the first aspect of the invention.
Figure 14:
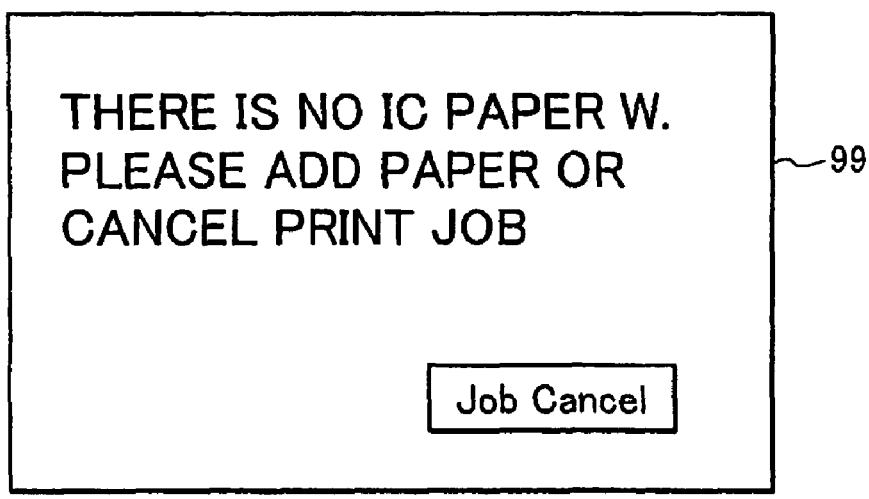
FIG. 14 is an explanatory diagram showing an error message displayed when there is insufficient IC paper in the multifunction device according to the first aspect of the invention.

However, in S39 of FIG. 13, if the CPU 90 determines that there exists no IC paper W having an RFID tag 80 storing user ID data corresponding to the user data for the printing operation, no IC paper W having a RFID tag 80 storing the data "ANY," and no normal IC paper W that does not possess a RFID tag 80 (S39: no), then in S41 the CPU 90 displays an error message on the display unit 101 of the touch panel 99 indicating that there is no IC paper W and a message for canceling the print job, as shown in FIG. 14.

If the user performs an operation to cancel the print job, that is, presses the cancel button in FIG. 14 (S42: yes), then in S43 the CPU 90 cancels the print job and ends the printing operation.

However, if the print job is not canceled (S42: no), then in S44 the CPU 90 detects whether the paper cassette 9 has been removed based on the signal received from the mounting sensor 82. If the paper cassette 9 has not been removed (S44: no), then the CPU 90 returns to S41 and continues displaying the error message.

If the CPU 90 detects that the paper cassette 9 has been removed (S44: yes), then the CPU 90 waits in the process of S45 until the paper cassette 9 has been fully inserted. When the paper cassette 9 has been fully inserted (S45: yes), then in S46 the CPU 90 reads the user ID data and the paper ID data from the RFID tags 80 of all IC paper W.

In S47 the CPU 90 determines whether IC paper W has been added to the paper cassette 9 by comparing the user ID data and paper ID data read in S46 to the user ID data and paper ID data stored in the CPU 90 before the paper cassette 9 was removed.

If the CPU 90 does not detect that IC paper W has been added (S47: no), then in S41 the CPU 90 again displays the error message and a message for canceling the print job.

However, if the CPU 90 detects that IC paper W has been added (S47: yes), then in S48 the CPU 90 removes the error message and returns to S35. In S35 the CPU 90 again determines the user ID data for the topmost IC paper W from the mounting and removal history of the paper cassette 9 to which IC paper W has been added, and the user ID data of the RFID tag 80 for the added IC paper W. Subsequently, the CPU 90 repeats the process of S35-S48 described above.

If the CPU 90 receives a printing request for a plurality of pages from an external personal computer connected via the network interface 95, the CPU 90 repeats the process of S32-S48 described above. For example, after executing the paper setting writing process in S38, the CPU determines whether the printing process has been performed on all pages of the printing request from the external personal computer. If the process has not been executed for all pages of the printing request, then the CPU 90 returns to S32. When the process has been performed for all pages of the printing request, then the process ends.

3. Effects of the First Aspect

The multifunction device 1 according to the first aspect described above determines whether to perform a printing operation based on data read by the IC reader/writer 81 and additional data added to the image data (user data and data indicating the number of pages). Hence, since the multifunction device 1 can perform printing based on data for the IC paper W actually accommodated in the paper cassette 9, the multifunction device 1 can allocate IC paper W for specific users (or user groups).

The CPU 90 determines whether to perform a printing operation based on the user ID data read by the IC reader/writer 81 and the user data in the additional data (data corresponding to the user ID data). Hence, it is possible to identify a user (or user group) when multiple users use a single image-forming device. Accordingly, the multifunction device 1 can reliably perform printing operations for each user (or user group).

The CPU 90 determines that the printing operation will be performed even if the IC reader/writer 81 does not find any user ID data. Accordingly, the CPU 90 determines that printing is possible for IC paper W having no user ID data stored in the RFID tag 80, enabling a user who has not been allocated IC paper W to print on the IC paper W.

The CPU 90 determines that the image will be printed if there exists IC paper W among the plurality of sheets of IC paper W for which user ID data could not be read. Hence, if the RFID tag 80 in any of the plurality of sheets of IC paper W is not storing user ID data, this IC paper W can be set as printable for all users, thereby enabling users unable to allocate their own IC paper W to print on the IC paper W.

When the CPU 90 determines that printing will not be performed, the CPU 90 notifies the user that printing will not be performed by displaying a message on the display unit 101 of the touch panel 99.

The CPU 90 determines whether to print in the image base on data stored in the RFID tag 80 for the sheet of IC paper W to be printed first, and additional data appended to the image data (user data and data indicating the number of pages). Therefore, it is possible to restrict printing to specific users or user groups.

The CPU 90 determines that printing will be performed when data stored in the RFID tag 80 of any of the sheets of IC paper W and read by the IC reader/writer 81 corresponds to the additional data appended to the image data. Hence, even if the additional data appended to the image data does not match data stored in the RFID tag 80 of the IC paper W to be printed first, printing can still be performed on the IC paper W if the additional data matches data stored in the RFID tag 80 of other IC paper W.

When the CPU 90 determines that printing will be performed, the IC reader/writer 81 rewrites data stored in the RFID tag 80 of the IC paper W corresponding to the additional data of the image data over data stored in the RFID tag 80 of the IC paper W on which printing will be performed for exactly the number of sheets of IC paper W required for the printing operation. Therefore, even if the additional data appended to the image data does not match data stored in the RFID tag 80 of the IC paper W to be printed first, this IC paper W can still be printed if the additional data corresponds to data stored in the RFID tag 80 of other IC paper W. Printing can be performed on all sheets of IC paper W based on the data stored in the corresponding RFID tags 80.

The IC reader/writer 81 reads data in the RFID tag 80 of IC paper W accommodated in the paper cassette 9 each time the CPU 90 detects that the paper cassette 9 has been removed and remounted. The CPU 90 stores this data in the RAM 92. If the IC reader/writer 81 reads data from the RFID tag 80 in the current detection that was not read in the previous detection, the CPU 90 stores data indicating that the IC paper W having this RFID tag 80 is the IC paper W stacked on top. This enables the CPU 90 to remember the order in which IC paper W storing different data is stacked in the paper cassette 9.

When the CPU 90 determines that the prescribed time has elapsed, the IC reader/writer 81 deletes data stored in the RFID tag 80 of the IC paper W. By deleting data in the RFID tag 80 of IC paper W that has not been used in a long time, the CPU 90 enables other users to print on this IC paper W.

Since IC paper W may be added when the paper cassette 9 is removed and remounted, the multifunction device 1 of the first aspect detects the removal and remounting of the paper cassette 9. When a detection is made, the IC reader/writer 81 reads data in the RFID tag 80 of the IC paper W accommodated in the paper cassette 9, thereby reliably acquiring data for the IC paper W accommodated in the paper cassette 9.

<Second Aspect>

In the printing process of the first aspect described above, the IC reader/writer 81 reads data from the RFID tags 80 each time the CPU 90 detects a request to print on IC paper W in order to confirm the number of sheets of IC paper W. However, in the printing process according to a second aspect of the present invention, the CPU 90 learns the number of sheets of IC paper W by counting the number of pages printed, rather than reading data from the RFID tags 80 each time a printing request is issued. In the following description of the second aspect, like parts and components are designated with the same reference numerals to avoid duplicating description.

(Printing Process)

Figure 15:
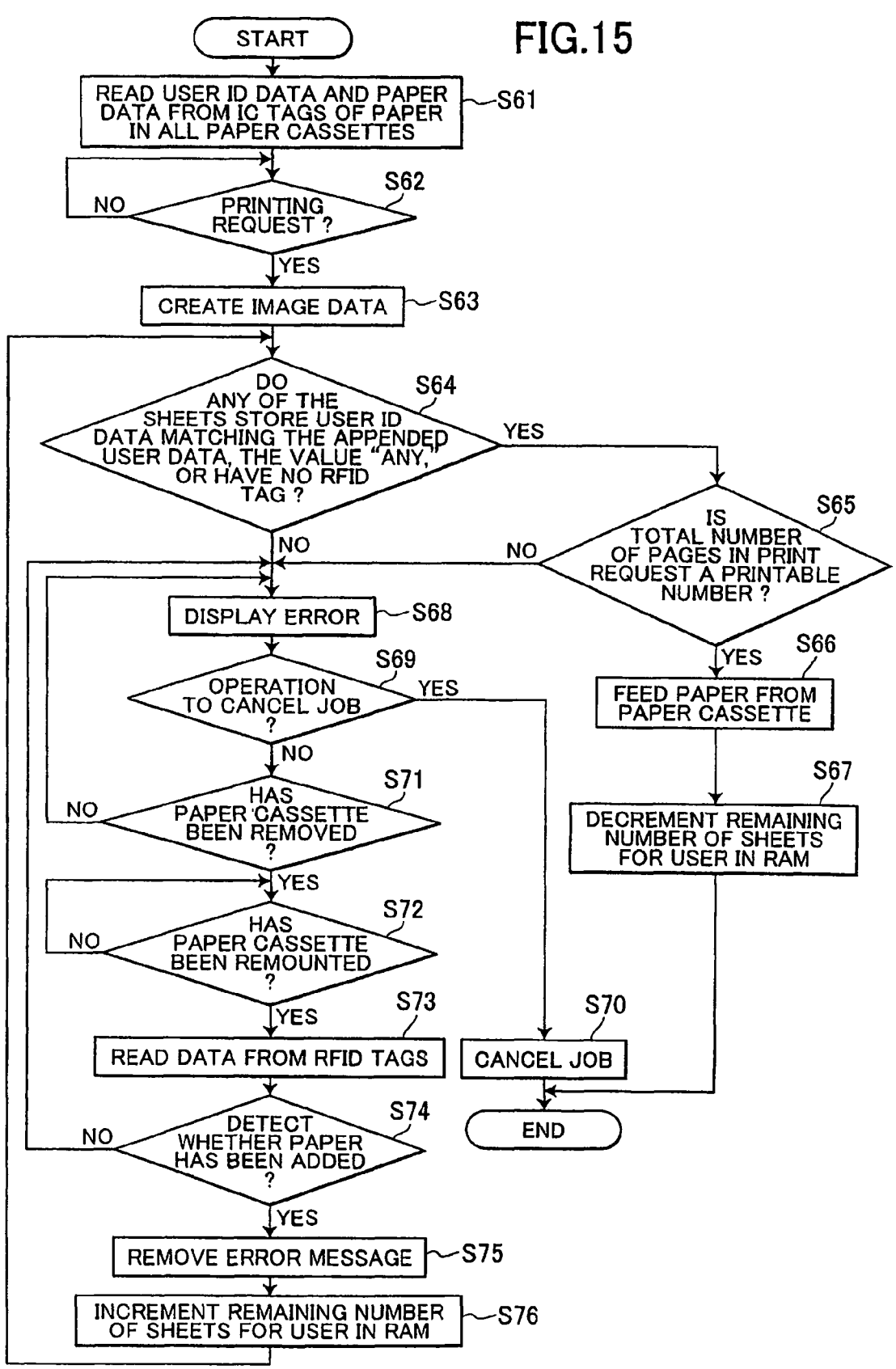
FIG. 15 is a flowchart illustrating steps in a printing process executed by the multifunction device according to a second aspect of the invention.

In S61 of the printing process shown in FIG. 15, the CPU 90 activates the IC reader/writer 81 to read data from the RFID tags 80 for all IC paper W (user ID data, and paper ID data attached to each sheet of IC paper W). The CPU 90 saves the data read in S61 to the RAM 92 in association with the paper cassette 9A or paper cassette 9B in which the paper is accommodated, as shown in FIG. 16.

When the CPU 90 receives a printing request from the control panel 6 (S62: yes), in S63 the CPU 90 creates image data by performing a process to develop PDL data received in the print job to bitmap data. At the same time, the CPU 90 saves additional data appended to the image data (user data and page data) to the RAM 92.

In S64 the CPU 90 determines whether any of the sheets of IC paper W has a RFID tag 80 storing the user ID data corresponding to the user data for the printing operation (or whether any of the sheets of IC paper W has a RFID tag 80 storing "ANY" or does not have a RFID tag 80).

If the CPU 90 determines that there exists IC paper W with a RFID tag 80 storing the user ID data corresponding to the user data for the printing operation (or that there exists IC paper W having a RFID tag 80 storing "ANY" or having no RFID tag 80; S64: yes), then in S65 the CPU 90 determines whether a number of pages in the print request is not greater than the number of sheets of IC paper W remaining in both of the paper cassettes 9A and 9B that have a RFID tag 80 storing the user ID data corresponding to the user data for the printing operation. In other words, the CPU 90 determines whether the number of available sheets is sufficient to print the number of pages in the print request.

If the number of printable pages is sufficient for the print request (S65: yes), then in S66 the CPU 90 performs a printing operation by feeding exactly the number of pages to be printed from the paper cassettes 9A and 9B.

In S67 the CPU 90 decrements the number of sheets stored in the RAM 92 for the user and each paper cassette 9 by the number of sheets used in the current printing operation for the user and each paper cassette 9, and ends the printing process.

However, if the CPU 90 determines that there exists no IC paper W having an RFID tag 80 storing user ID data corresponding to the user data for the printing operation, no IC paper W having a RFID tag 80 storing the data "ANY," and no normal IC paper W not possessing a RFID tag 80 (S64: no), then in S68 the CPU 90 displays an error message on the display unit 101 of the touch panel 99 indicating that there is no IC paper W and a message for canceling the print job, as shown in FIG. 14.

If the user performs an operation to cancel the print job (S69: yes), then in S70 the CPU 90 cancels the print job and ends the printing operation.

However, if the print job is not canceled (S69: no), then in S71 the CPU 90 detects whether the paper cassette 9 has been removed based on the signal received from the mounting sensor 82. If the paper cassette 9 has not been removed (S71: no), then the CPU 90 returns to S68 and continues displaying the error message.

If the CPU 90 detects that the paper cassette 9 has been removed (S71: yes), then the CPU 90 waits in the process of S72 until the paper cassette 9 has been fully inserted. When the paper cassette 9 has been fully inserted (S72: yes), then in S73 the CPU 90 reads the user ID data and the paper ID data from the RFID tags 80 of the IC paper W.

In S74 the CPU 90 determines whether IC paper W has been added to the paper cassette 9 by comparing the data read in S73 to the user ID data and paper ID data stored in the CPU 90 before the paper cassette 9 was removed.

If the CPU 90 does not detect that IC paper W has been added (S74: no), then in S68 the CPU 90 again displays the error message and a message for canceling the print job.

However, if the CPU 90 detects that IC paper W has been added (S74: yes), then in S75 the CPU 90 removes the error message and in S76 increments the remaining number of sheets stored in the RAM 92 for each user by the number of added IC paper W.

Returning to S64, the CPU 90 again determines whether any of the sheets of IC paper W has a RFID tag 80 storing the user ID data corresponding to the user data for the printing operation (or whether any of the sheets of IC paper W has a RFID tag 80 storing "ANY" or does not have a RFID tag 80). In this way, the CPU 90 repeats the process of S64-S76 described above.

(Effects of the Second Aspect)

The CPU 90 decrements the count each time the IC paper W is used in a printing operation and increments the count when new IC paper W is loaded in the paper cassette 9. Accordingly, the IC reader/writer 81 need not read data for the IC paper W before printing on the same in order to learn the number of pages.

Figure 12:
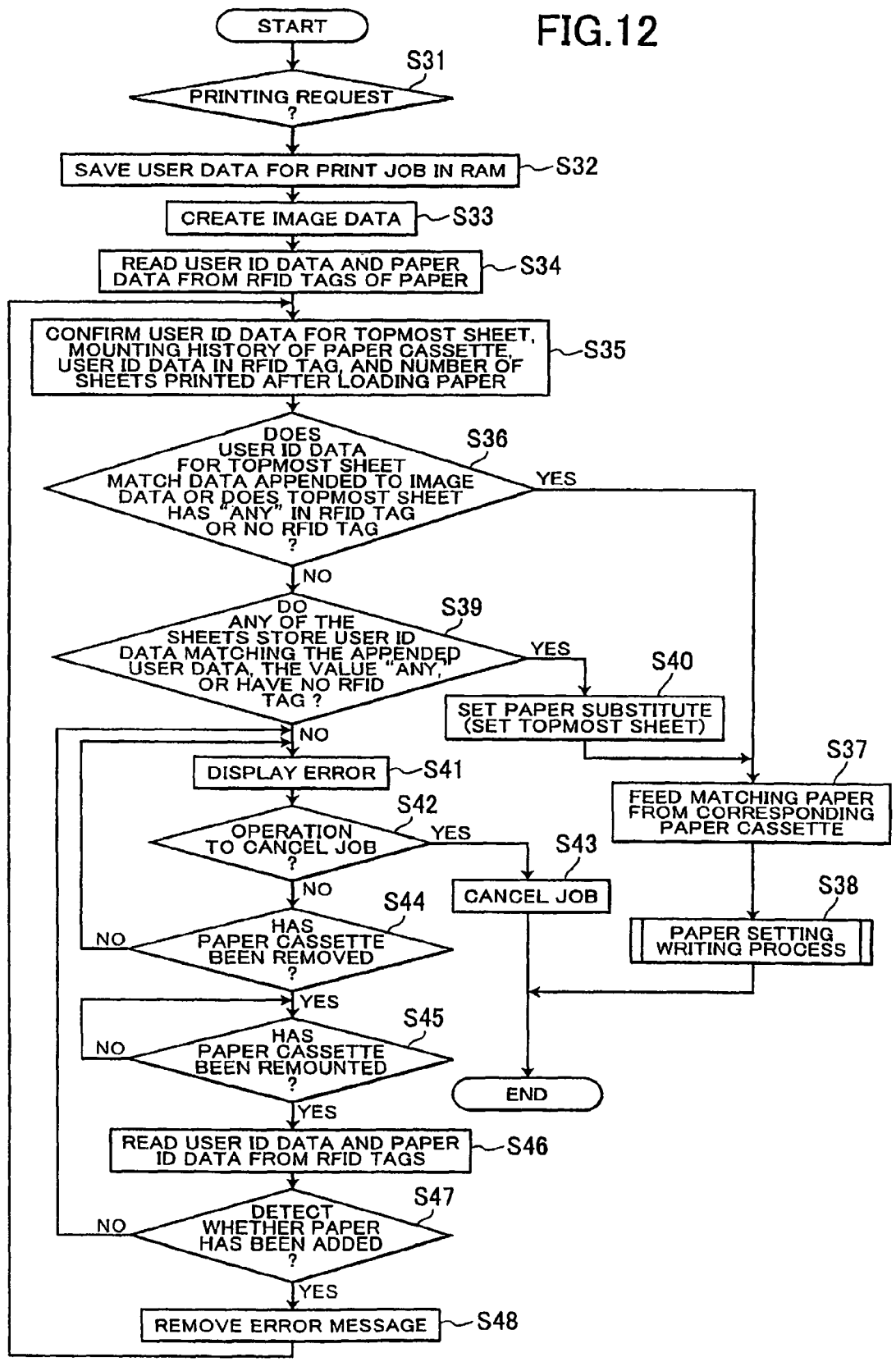
FIG. 12 is a flowchart illustrating steps in a printing process executed by the multifunction device according to the first aspect of the invention.

The second aspect differs from the first aspect in that the number of sheets stored in the RAM 92 is increased or decreased according to the printing request, eliminating the need to perform the paper substitution setting process (FIG. 12, S38) for rewriting data stored in the RFID tags 80.

(Variations of the Aspects)

While the invention has been described in detail with reference to specific embodiments thereof, it would be apparent to those skilled in the art that many modifications and variations may be made therein without departing from the spirit of the invention, the scope of which is defined by the attached claims.

In the first aspect described above, the CPU 90 acquires data for the topmost sheet of IC paper W stacked in the paper cassette 9 based on the mounting and removal history of the paper cassette 9 and data read from the RFID tags 80 when the paper cassette 9 is remounted. However, data for the topmost sheet of IC paper W may be recognized directly by performing a separate operation to read data from the RFID tag 80 in the topmost sheet of IC paper W.

For example, an IC reader (writer) having an antenna with low sensitivity may be employed so that the antenna of the IC reader must be placed in close contact with the RFID tag 80 (incorporating an antenna in a chip) of the topmost sheet of IC paper W in order to read data therefrom. Alternatively, an IC reader (writer) may be disposed along the paper-conveying path near the paper cassette 9 for reading data from the RFID tag 80 in the topmost sheet of IC paper W when the topmost sheet is fed a short distance.

Further, the CPU 90 may store sequential data (IDs assigned an order) in the RFID tags 80 of IC paper W stacked in the paper cassette 9. Hence, when the user loads IC paper W in the paper cassette 9, the IC reader (writer) can read the sequential data to acquire data for the topmost sheet of IC paper W.

The IC reader/writer 81 of the above aspects reads data from the RFID tags 80 for all IC paper W accommodated in the paper cassette 9 at once. However, the IC reader/writer may be configured to read data from the RFID tags 80 of the IC paper W accommodated in the paper cassettes 9A and 9B separately.

For example, the paper cassette 9A or the paper cassette 9B may be provided with an IC reader/writer antenna (not shown) capable of reading and rewriting data in the RFID tags 80 of IC paper W accommodated in only the paper cassette 9A or paper cassette 9B. Specifically, with a reduced output, the IC reader/writer for one of the paper cassette 9 will not be capable of reading or rewriting data in the RFID tags 80 accommodated in the other paper cassette 9.

While there is a danger that the reading range of the IC reader/writer will be limited when the output is reduced in this way, it is possible to alter the position of the RFID tags 80 in the IC paper W accommodated in the top paper cassette 9A from the position in the IC paper W accommodated in the bottom paper cassette 9B. By disposing the IC reader/writer antennas at positions corresponding to the positions of the RFID tags 80, the IC reader/writer can reliably read data from the corresponding RFID tags 80.

It is also possible to provide a metal shield or the like between the paper cassettes 9A and 9B, thereby eliminating a need to reduce the output of the IC reader/writers and enabling the IC reader/writers to read data in the RFID tags 80 reliably.

Further, instead of modifying the structure of the IC reader/writer 81, it is possible to include data on the paper cassette 9 in the RFID tags 80 of the IC paper W. The user loads IC paper W in the paper cassette 9A or the paper cassette 9B according to the data stored in the IC paper W that specifies the paper cassette 9A or paper cassette 9B. In this way, the IC reader/writer 81 can acquire data on the paper cassette when reading the RFID tags 80.

The printing process according to the first aspect described above is configured to repeat S31 until a printing request is received from an external personal computer (or via the control panel 6). However, the CPU 90 may end the printing process when a printing request has not been received from an external personal computer or the like, and may repeat the sequence of the added paper reading process in S1, the unused paper rewriting process in S2, and the printing process in S3.

In the above aspects, the CPU 90 activates the IC reader/writer 81 when the paper cassette 9 is completely mounted for reading data stored in the RFID tags 80 of all IC paper W accommodated in the paper cassette 9. When IC paper W having no data stored in the RFID tag 80 is detected at this time, the IC reader/writer 81 may rewrite data to the RFID tags 80 of this IC paper W (paper ID data for distinguishing the plurality of sheets of IC paper W, and user ID data for identifying users that can use the IC paper W) from the touch panel 99. This configuration enables the user to rewrite data to the RFID tags 80 of the IC paper W, improving user-friendliness.

What is claimed is:

1. An image-forming device comprising:
   a casing that defines an outer frame;
   an accommodating section that is detachably mounted in the casing and configured to accommodate a stack of sheets including sheets having a storage section capable of storing data;
   a receiving unit that receives a print request requesting printing based on image data attached with additional data;
   a reading unit that reads data stored in the storage section;

a determining unit that determines, based on the data read by the reading unit and the additional data attached to the image data, whether to print an image corresponding to the image data; and a printing unit that prints the image on a sheet based on the image data when the determining unit allows printing to be performed.

2. The image-forming device according to claim 1, wherein the determining unit allows the printing operation to be performed even if a sheet with the storage section in which no data is stored is accommodated in the accommodating section.

3. The image-forming device according to claim 1, wherein the determining unit allows the printing operation to be performed even if the accommodating section accommodates a sheet without having the storage section.

4. The image-forming device according to claim 1, wherein the determining unit determines whether to print the image based on the data stored in the storage section of a topmost sheet stacked in the accommodating section, and the additional data attached to the image data.

5. The image-forming device according to claim 1, further comprising a counting unit that counts how many sheets having same data stored in the respective storage sections are accommodated in the accommodating section, the counting unit decrementing a count value each time the sheet is used for printing and incrementing a count value each time a new sheet is supplemented in the accommodating section.

6. The image-forming device according to claim 1, further comprising a writing unit capable of writing data to the storage section of the sheet.

7. The image-forming device according to claim 1, further comprising a detecting unit that detects removal and remounting of the accommodating section;

wherein the reading unit reads data from the storage section of a sheet accommodated in the accommodating section when the detecting unit detects remounting of the accommodating section.

8. The image-forming device according to claim 7, further comprising:

a data storing unit that stores data read by the reading unit from the storage section of a sheet accommodated in the accommodating section when the detecting unit detects remounting of the accommodating section; and a storage controlling unit that stores such data in the data storing unit that indicates that a sheet is stacked on top in the accommodating section when the data stored in the storage section of the sheet is not stored in the data storing unit.

9. The image-forming device according to claim 1, wherein
the data stored in the storage section includes user ID data for identifying a user authorized to use the sheet;
the additional data includes data associated with the user ID data; and
the determining unit determines whether to perform a printing operation based on the user ID data read by the reading unit and the additional data.

10. The image-forming device according to claim 9, further comprising a notifying unit that notifies a user that the image cannot be printed when the determining unit determines that the printing operation is not to be performed.

11. The image-forming device according to claim 9, wherein the determining unit allows the printing operation to be performed when the user ID data in the storage section of any of the sheets is in association with the additional data attached to the image data subject to the printing operation.

12. The image-forming device according to claim 11, further comprising a rewriting unit that rewrites the user ID data stored in the storage section of a sheet, the rewriting unit rewriting the user ID data stored in the storage section of one sheet and associated with the additional data attached to the image data subject to printing, to data stored in the storage section of another sheet on which the determining unit has determined to print, wherein the rewriting unit rewrites the user ID data with respect to a number of sheets on which the determining unit has determined to print.

13. The image-forming device according to claim 9, further comprising:

a measuring unit that measures a time elapsing after the user has performed a printing operation; and a deleting unit that deletes the user ID data stored in the storage section of the sheet when the time measured by the measuring unit exceeds a prescribed time.

14. The image-forming device according to claim 9, further comprising:

a measuring unit that measures a time elapsing after the sheet has been loaded in the accommodated section; and a deleting unit that deletes user ID data stored in the storage section of the sheet when the time measured by the measuring unit exceeds a prescribed time.

15. The image-forming device according to claim 9, further comprising:

a measuring unit that measures a time elapsing after the user has performed a printing operation; and a rewriting unit that rewrites the user ID data stored in the storage section of the sheet when the time measured by the measuring unit exceeds a prescribed time.

16. The image-forming device according to claim 9, further comprising:

a measuring unit that measures a time elapsing after the sheet has been loaded in the accommodated section; and a rewriting unit that rewrites the user ID data stored in the storage section of the sheet when the time measured by the measuring unit exceeds a prescribed time.

17. The image-forming device according to claim 9, wherein the determining unit further determines whether a number of pages in a print request for a user is less than a number of sheets in the accommodating section that have the storage sections storing the user ID data corresponding to the user of the print request.

* * * * *